US010028251B2

(12) United States Patent
Rinne et al.

(10) Patent No.: US 10,028,251 B2
(45) Date of Patent: Jul. 17, 2018

(54) MANAGEMENT OF A PROTOCOL INTERFACE FOR A HETEROGENEOUS NETWORK CONNECTION

(75) Inventors: Mika P. Rinne, Espoo (FI); Yang Liu, Beijing (CN); Haitao Li, Beijing (CN); Seppo Vesterinen, Oulunsalo (FI)

(73) Assignee: Nokia Technologies Oy, Espoo (FI)

( * ) Notice: Subject to any disclaimer, the term of this patent is extended or adjusted under 35 U.S.C. 154(b) by 9 days.

(21) Appl. No.: 14/412,437

(22) PCT Filed: Aug. 17, 2012

(86) PCT No.: PCT/US2012/051486
§ 371 (c)(1),
(2), (4) Date: Dec. 31, 2014

(87) PCT Pub. No.: WO2014/028033
PCT Pub. Date: Feb. 20, 2014

(65) Prior Publication Data
US 2015/0173044 A1    Jun. 18, 2015

(51) Int. Cl.
*H04W 72/02* (2009.01)
*H04W 48/16* (2009.01)
*H04W 76/12* (2018.01)
*H04W 84/10* (2009.01)
*H04W 84/12* (2009.01)
*H04W 88/06* (2009.01)

(52) U.S. Cl.
CPC ........... *H04W 72/02* (2013.01); *H04W 48/16* (2013.01); *H04W 76/12* (2018.02); *H04W 84/10* (2013.01); *H04W 84/12* (2013.01); *H04W 88/06* (2013.01)

(58) Field of Classification Search
CPC ............................. H04W 72/02; H04W 48/16
See application file for complete search history.

(56) References Cited

U.S. PATENT DOCUMENTS

| 2011/0113157 A1* | 5/2011 | Kim | ................... H04W 76/022 709/248 |
| 2013/0028069 A1* | 1/2013 | Pelletier | ............ H04W 72/0453 370/216 |

(Continued)

OTHER PUBLICATIONS

International Search Report and Written Opinion received for corresponding Patent Cooperation Treaty Application No. PCT/US2012/051486, dated May 21, 2013, 9 pages.

(Continued)

*Primary Examiner* — Michael Thier
*Assistant Examiner* — Brian P Cox
(74) *Attorney, Agent, or Firm* — Mintz Levin Cohn Ferris Glovsky and Popeo, P.C.

(57) ABSTRACT

Methods and apparatus, including computer program products, are provided for a protocol interface for a heterogeneous network. In one aspect there is provided a method. The method may include detecting, by a user equipment, a local area radio network; and establishing, at the user equipment, a first entity configured to manage a first radio resource of a local area radio network, wherein the first entity includes an interface to a second entity, at the user equipment, configured to manage a second radio resource of a cellular radio network. Related apparatus, systems, methods, and articles are also described.

17 Claims, 10 Drawing Sheets

(56) References Cited

U.S. PATENT DOCUMENTS

| | | | | |
|---|---|---|---|---|
| 2013/0029639 A1* | 1/2013 | Lee | .................. | H04W 92/02 |
| | | | | 455/411 |
| 2013/0329694 A1* | 12/2013 | Vrzic | .................. | H04W 36/165 |
| | | | | 370/331 |
| 2014/0248862 A1* | 9/2014 | Periyalwar | ............ | H04W 48/18 |
| | | | | 455/418 |

OTHER PUBLICATIONS

3GPP, "Technical Specification Group Radio Access Network; Evolved Universal Terrestrial Radio Access (E-UTRA); LTE physical layer; General description (Release 13)," 3rd Generation Partnership Project, 3GPP TS 36.201 V13.2.0, Jun. 2016.

3GPP, "Technical Specification Group Radio Access Network; Evolved Universal Terrestrial Radio Access (E-UTRA); Mulitplexing and channel coding (Release 13)," 3rd Generation Partnership Project, 3GPP TS 36.212 V13.2.0, Jun. 2016.

3GPP, "Technical Specification Group Radio Access Network; Evolved Universal Terrestrial Radio Access (E-UTRA); Packet Data Convergence Protocol (PDCP) specification (Release 8)," 3rd Generation Partnership Project, 3GPP TS 36.323 V8.2.1, May 2008.

3GPP, "Technical Specification Group Radio Access Network; Evolved Universal Terrestrial Radio Access (E-UTRA); Physical channels and modulation (Release 13)," 3rd Generation Partnership Project, 3GPP TS 36.211 V13.2.0, Jun. 2016.

3GPP, "Technical Specification Group Radio Access Network; Evolved Universal Terrestrial Radio Access (E-UTRA); Physical layer procedures (Release 8)," 3rd Generation Partnership Project, 3GPP TS 36.213 V8.2.0, Mar. 2008.

3GPP, "Technical Specification Group Radio Access Network; Evolved Universal Terrestrial Radio Access (E-UTRA); Physical layer; Measurements (Release 13)," 3rd Generation Partnership Project, 3GPP TS 36.214 V13.2.0, Jun. 2016.

3GPP, "Technical Specification Group Radio Access Network; Evolved Universal Terrestrial Radio Access (E-UTRA); Radio Resource Control (RRC); Protocol specification (Release 12)," 3rd Generation Partnership Project, 3GPP TS 36.331 V12.10.0, Jun. 2016.

ETSI, "LTE; Evolved Universal Terrestrial Radio Acces (E-UTRA); Radio Link Control (RLC) protocol specification (3GPP TS 36.322 V8.8.0)," ETSI TS 136 322, V8.8.0, Jul. 2010.

ETSI, "LTE; Evolved Universal Terrestrial Radio Access (E-UTRA); Medium Access Control (MAC) protocol specification (3GPP TS 36.321 V12.5.0)," ETSI TS 136 321, V12.5.0, Apr. 2015.

* cited by examiner

| MessageType | TransactionIdentifier | IE[instance] |
|---|---|---|
| | | IE[instance] |
| | | IE[instance] |

FIG. 5A

| eMessageType | eTransactionIdentifier | eIE[instance] |
|---|---|---|
| | | eIE[instance] |
| | | eIE[instance] |

FIG. 5B

MANAGEMENT OF A PROTOCOL INTERFACE FOR A HETEROGENEOUS NETWORK CONNECTION

RELATED APPLICATION

This application was originally filed as PCT Application No. PCT/US2012/051486 filed Aug. 17, 2012.

The subject matter described herein relates to wireless communications.

BACKGROUND

Heterogeneous networks may include macrocells, picocells, femtocells, or a combination thereof. A heterogeneous network may include one or more wireless access points, or base stations, such as an E-UTRAN (evolved Universal Mobile Telecommunications System Terrestrial Radio Access Network) NodeB base station serving macrocells, and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have functionality similar to a typical base station, such as an E-UTRAN NodeB (eNB) base station, but the small cell base station may have less range and power given its limited coverage area. For example, the small cell base station may be implemented as a femtocell wireless access point/base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage into a small cell, as a way to offload traffic to the small cell base stations, and/or as a way to provide enhanced service, such as higher data rates, lower latencies, energy efficiency and the like, within the small cell, when compared to the larger macrocell served by a typical base station, such as the eNB base station.

SUMMARY

Methods and apparatus, including computer program products, are provided for a protocol interface for a heterogeneous network. In one aspect there is provided a method. The method may include detecting, by a user equipment, a local area radio network; and establishing, at the user equipment, a first entity configured to manage a first radio resource of a local area radio network, wherein the first entity includes an interface to a second entity, at the user equipment, configured to manage a second radio resource of a cellular radio network.

In another aspect, there is provided an apparatus including at least one processor; and at least one memory including computer program code for one or more programs, the at least one processor, the at least one memory, and the computer program code configured to cause the apparatus to at least detect a local area radio network; and establish a first entity configured to manage a first radio resource of a local area radio network, wherein the first entity includes an interface to a second entity, at the user equipment, configured to manage a second radio resource of a cellular radio network.

In another aspect, there is provided a computer-readable storage medium including code which when executed by at least one processor causes operations which may include detecting, by a user equipment, a local area radio network; and establishing, at the user equipment, a first entity configured to manage a first radio resource of a local area radio network, wherein the first entity includes an interface to a second entity, at the user equipment, configured to manage a second radio resource of a cellular radio network.

In some example embodiments, one of more variations may be made as well as described in the detailed description below and/or as described in the following features. The first entity and the second entity may each comprise a radio resource control entity. The interface may route one or more radio resource control messages from the second entity to the first entity to manage the second radio resource of a cellular network via the local area radio network. The one or more radio resource control messages may include an indication representative of whether to route to the first entity or the second entity. A header of a packet data convergence protocol message may include the indication. The first entity and the second entity may be configured in a single protocol stack at the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIGS. 5A-5B depict examples of RRC message types, in accordance with some example embodiments;

FIGS. 6-7A depict examples of multiplexed RRC messages, in accordance with some example embodiments;

Figure 1:
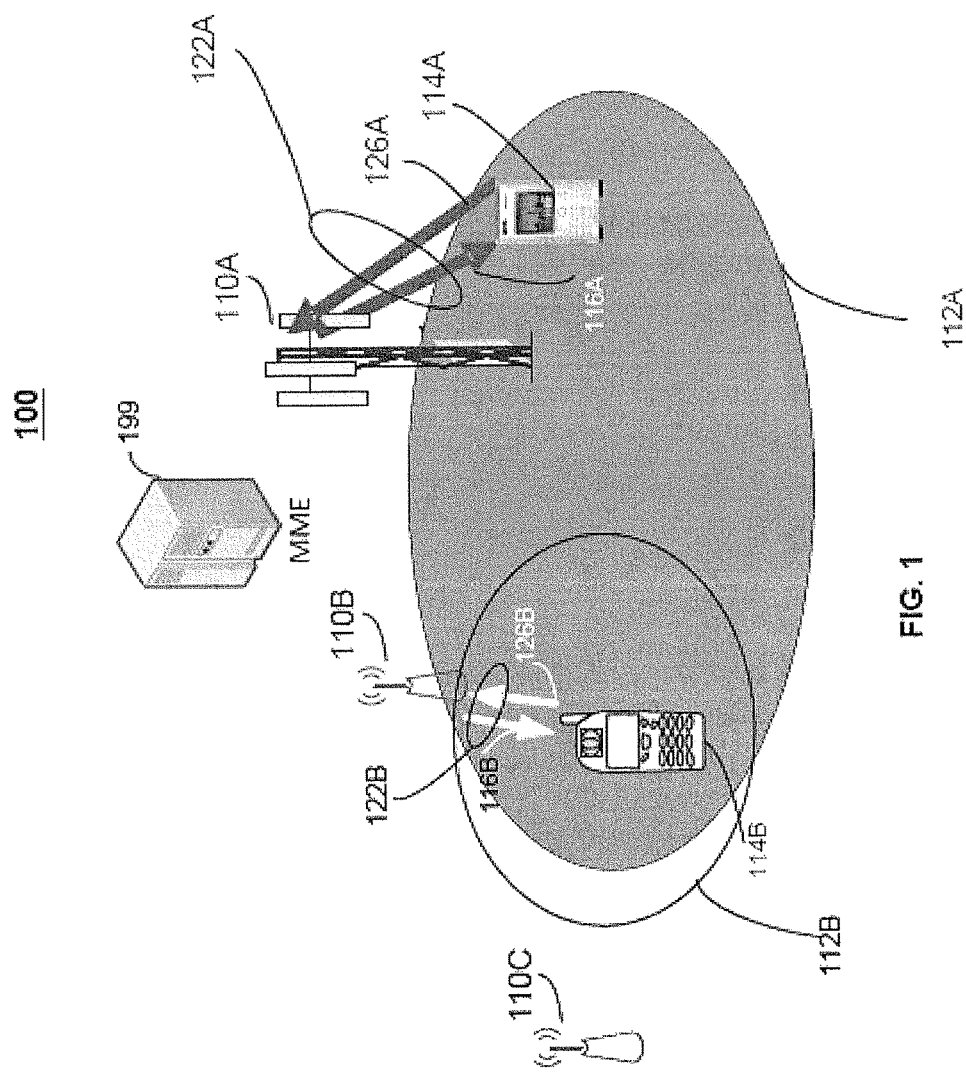
FIG. 1 depicts an example of a heterogeneous network, in accordance with some example embodiments.

Like labels are used to refer to same or similar items in the drawings.

DETAILED DESCRIPTION

In some example embodiments, a heterogeneous network may be extended, such that a user equipment may have connectivity via a macrocell and an eNB base station/wireless access point to a first network, such as an Evolved Packet System (EPS), and have connectivity via a small cell and a small cell base station/wireless access point to a second local area radio network. The user equipment may operate in the local area radio network using one or more Internet Protocols for networking and cellular defined interfaces and radio protocols, such as standards defined by the Third Generation Partnership Project (3GPP) and the like, to operate in the local area network. The local area network connection may also serve as a sub-network, a sub-system, and/or a local network domain in the interconnected networks, such as the Internet or Intranet.

To manage radio connections, the user equipment may establish an entity to manage the connection established in the local area radio network to the small cell base station/wireless access point. For example, the user equipment may establish a Radio Resource Control (RRC) protocol or another RRC-protocol like entity to manage the radio connection(s) for the local area radio network. This established local area RRC protocol entity may be established within a single RRC protocol layer together with, or as a sub-entity of, the EPS RRC-protocol layer. This local area RRC-protocol entity may be established, when there is a connection available from the user equipment to the small cell base station in the local area radio network. If the user equipment disconnects from the local area radio network, the established local area RRC protocol entity may be terminated, but the user equipment may maintain the RRC protocol entity for the EPS.

In some example embodiments, the user equipment includes a service access point that interfaces the RRC protocol entity for the local area radio network (also referred to as the local area RRC entity and local area RRC protocol entity) with the RRC protocol entity for the EPS (also referred to as EPS RRC entity and EPS RRC protocol entity). Moreover, the service access point (SAP) may be established and configured within a single RRC protocol layer as noted above. Furthermore, the service access point may define how the local area RRC entity is created (SAP opened) and/or terminated (SAP closed). Once the second, local area RRC entity, is established, that service access point may also provide services to the EPS RRC entity, such as delivering, routing, and/or embedding EPS RRC protocol messages via the local area network connection. The service access point may also act as the interface for interaction between the local area RRC entity and the EPS RRC entity. This interface allows the local area RRC entity to send, and/or receive RRC messages locally from/to the EPS RRC entity, and also to exchange configurations or related information with the EPS RRC entity.

Before providing additional examples regarding the service access point, local area RRC entity, and the EPS RRC entity, the following provides an example of a system framework in which some of the example embodiments described herein may be implemented.

FIG. 1 depicts a system 100 according to some example embodiments. System 100 may include one or more user equipment, such as user equipment 114A-B, one or more wireless access points, such as base stations 110A-C. In some example embodiments, base station 110A may serve a cell, such as macrocell 112A, several cells, cell sectors, and/or multiple cells on different carrier frequencies, and base station 110B may serve a local area radio network, such as small cell 112B, although base station 110B may serve other types of cells as well. Moreover, the base stations may have wired and/or wireless backhaul links to other network nodes, such as a mobility management entity 199, other base stations, a radio network controller, a core network, a serving gateway, and the like.

In some example embodiments, user equipment 114A-B may be implemented as a user equipment and/or a stationary device. The user equipment 114A-B are often referred to as, for example, mobile stations, mobile units, subscriber stations, wireless terminals, tablets, smart phones, pads, communicators or the like. A user equipment may be implemented as, for example, a wireless handheld device, a wireless plug-in accessory, or the like. In some example embodiments, user equipment may include a processor, a computer-readable storage medium (e.g., memory, storage, and the like), a radio access mechanism, and/or a user interface.

In some example embodiments, the user equipment 114A-B may be implemented as multi-mode user devices configured to operate using a plurality of radio access technologies. For example, user equipment 114B may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technology including other 3GPP radio access technologies (e.g., GERAN, WCDMA, HSPA, LTE, LTE-Advanced, IMT, IMT-A, and the like).

One or more of the base stations 110A-C may, in some example embodiments, be implemented as an evolved NodeB (eNB) type base station, although other types of radio access points may be implemented as well. When the evolved NodeB (eNB) type base station is used, the base stations may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, TS 36.300, protocol specifications like TS 36.321, TS 36.322, TS 36.323, TS 36.331, and any subsequent additions or revisions to these and other 3GPP series of standards collectively referred to as the LTE standards.

One or more of the base stations 110A-C may, in some example embodiments, be configured to serve small cells using a WLAN technology, such as WiFi (e.g., the IEEE 802.11 series of standards), and any other local area radio access technology. For example, base station 110B may, in some example embodiments, be implemented to a serve local area radio network, such as small cell 112B. Moreover, base station 110B may be configured to operate with a plurality of radio access technologies including one or more of LTE, WiFi, BT-LE, and/or any other wireless local area network standard. In some example embodiments, the base station 110B may be implemented as a home evolved NodeB (HeNB) base station serving small cell 112B, which covers a structure or a predefined area, such as a home, an office building, and the like.

In some example embodiments, the system 100 may include access links, such as links 122A-B. The access links 122A may include a downlink 116A for transmitting to the user equipment 114A and an uplink 126A for transmitting from user equipment 114A to the base station 110A. The downlinks 116A-B may comprise a modulated radio frequency carrying information, such as user data, radio resource control (RRC) messages, and the like, and the uplinks 126A-B may comprise a modulated radio frequency carrying information, such as user data, RRC messages, measurement reports associated with handovers, and the like.

Although FIG. 1 depicts a specific quantity and configuration of base stations, cells, and user equipment, other quantities and configurations may be implemented as well.

Figure 2:
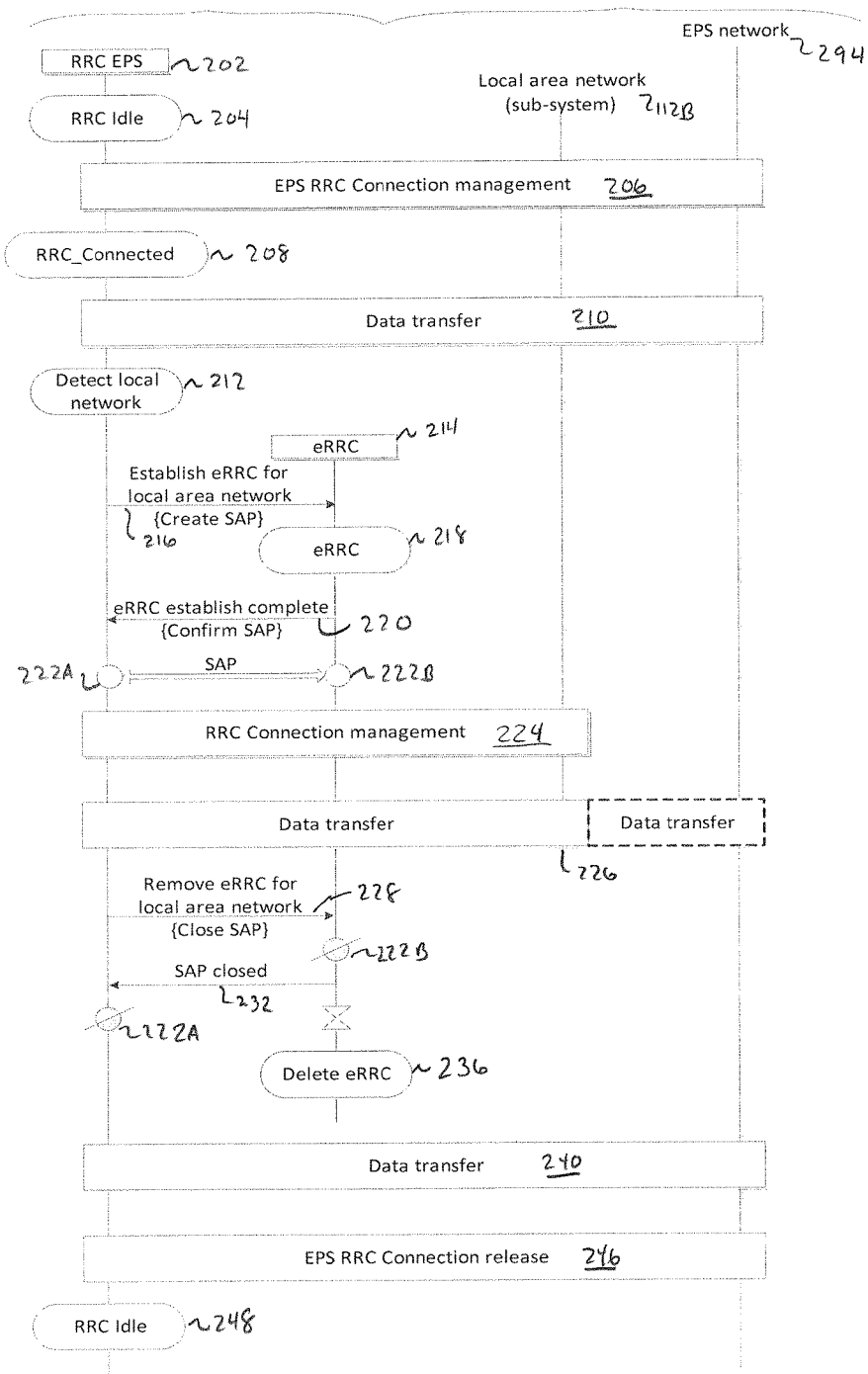
FIG. 2 depicts an example of a connection management process based on two RRC entities at the user equipment, in accordance with some example embodiments.

FIG. 2 depicts a connection management process 200 based on two RRC entities at the user equipment, in accordance with some example embodiments.

At 202, user equipment 114B may include an EPS RRC entity, and the corresponding mode at 204 may be idle mode. The EPS RRC entity may be established at user equipment 114B to provide RRC signaling (or messaging) to the network, such as the EPS network 294 (e.g., base station 110 and the like). Next, the user equipment 114B may establish RRC connection, at 206, to a first network, such as an EPS network 294. For example, the RRC connection to the eNB may allow RRC management of radio resources in a radio network to further allow internet protocol connections via eNB base station 110A and/or other nodes in that network to the Internet. The connection at 206 may result in a state change to a connected state at 208 (e.g., "RRC Connected"). When the connected state is established at 208, the user equipment 114B may transfer, at 210, data with network 294 via, for example, EPS bearers, IP bearers, flows or their combinations.

At 212, user equipment 114B may detect a local area radio network 112B enhanced to allow RRC connections therein. For example, user equipment 114B may detect local area radio network 112B or the wireless access point 110B serving that network.

At 216, user equipment 114B may establish a local area RRC entity (labeled eRRC) 214 configured to access the local area radio network 112B, and this local area RRC entity may be used as to allow establishment of an RRC connection to local area radio network 112B. Moreover, the user equipment's local area RRC entity may internally establish a RRC entity (e.g., a RRC sub-entity) for the enhanced local area network 112B and create the service access point at 216 to allow use of its protocol services.

After the service access point is created and confirmed at 216-220, the protocol services provided by the service access point at 222A-B are available for radio resource management of the user equipment. At 224, the user equipment 114B may perform RRC connection management via its SAP 222A-B with the local area network 112B. User equipment 114B may also conduct data transfer at 226 with the local area network 112B or via that local area network to the EPS network 294 (e.g., via cell 112A and base station 110A), in addition to, or instead of, data transfer 210 with the EPS network 294.

In some example embodiments, when the local area network 112B becomes unavailable (e.g., due to lack of coverage, selection of another local area network, or if the EPS connection management guides user equipment 114B to disable the local area connection, and the like), user equipment 114B may close SAP 222A-B as depicted by 228-232. When SAP 222A-B is closed, the protocol services of the enhanced local area network 112B may not be available and the local area network connection will terminate. At 236, the local area RRC entity for that enhanced local area RRC connection may be deleted, and the user equipment context may be deleted, erased, and the like. This deletion may happen immediately, conditionally, or after a timer expiration to avoid unnecessary frequent closing and opening actions. In some example embodiments, the EPS RRC connection and its states may not be impacted by the establishment and/or termination of the local area RRC entity or the SAP 222A-B. At 240, the user equipment may continue to conduct data transfer with EPS network 294. At 246, the EPS RRC connection may be released, in which case the state of the RRC may return to an idle state at 248.

In some example embodiments, the process 200 allows the establishment of two RRC entities, the local area RRC entity and the EPS RRC entity, and a service access point to allow RRC management in the heterogeneous network 290. In some implementations, establishment of the local area RRC entity may provide a high level of compatibility to legacy EPS protocol functions, while providing a mechanism of establishing a protocol SAP for enhancing the EPS connectivity with additional local area network connectivity.

Figure 3:
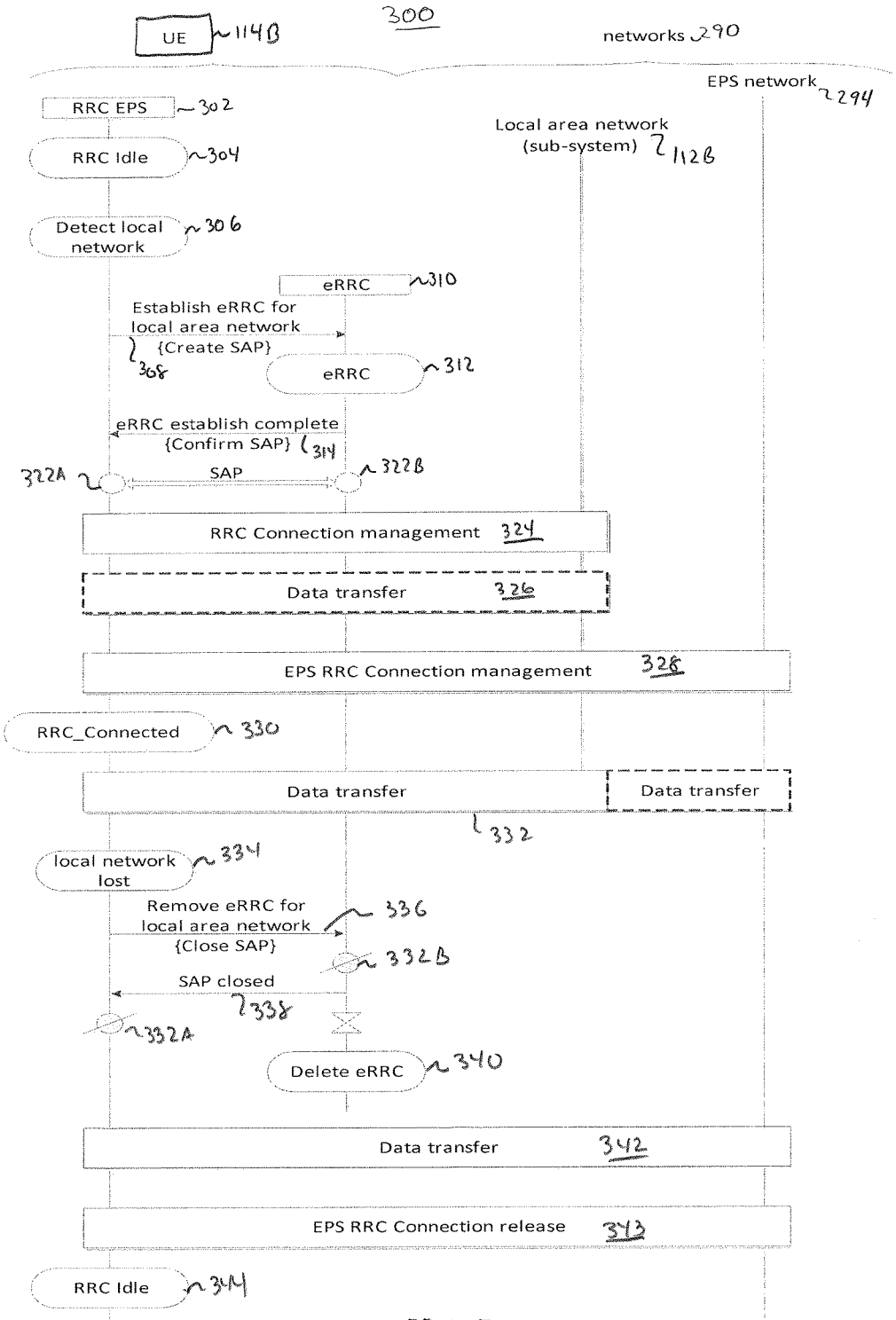
FIG. 3 depicts another example of a connection management process based on two RRC entities at the user equipment, in accordance with some example embodiments.

FIG. 3 depicts a connection management process 300 based on two RRC entities at the user equipment, in accordance with some example embodiments.

At 302-304, the user equipment 114B may include an EPS RRC entity in an idle state camping in an EPS network 294.

At 306, the user equipment 114B may detect a local area radio network 112B enhanced to allow RRC connections therein. For example, user equipment 114B may detect local area radio network 112B and/or a WiFi wireless access point at 1108, although other types of local area radio network may be used as well.

At 308, user equipment 114B may establish a local area RRC entity (labeled eRRC) 310 configured to access the local area radio network 112B, and this local area RRC entity may be used a service access point to allow establishment of RRC connection to local area radio network 112B. Moreover, the user equipment's EPS RRC entity may internally establish a RRC entity (e.g., an RRC sub-entity) for the enhanced local area network 112B and create the service access point at 308-314 to allow use of its protocol services.

After the service access point is created and confirmed at 308-314, the protocol services provided by the service access point at 322A-B are available for radio resource management of the user equipment. At 324, the user equipment 114B may perform RRC connection management via SAP 322A-B. User equipment 114B may also conduct data transfer at 326 with the local area network 112B or establish RRC connection 328 with the EPS network 294 (e.g., via cell 112A and base station 110A) via the local area network to allow data transfer 332 with the EPS network 294.

At 328, an EPS RRC connection may be established. The EPS RRC connection may be associated with a base station, such as eNB base station 110A, and EPS bearers may be setup to carry data via the EPS network. At 330, user equipment 114B may be in a connected state (e.g., "RRC Connected") with respect to the EPS network 294. When the connected state is established at 330, user equipment 114B may transfer at 332 data to network 294 via, for example, EPS bearers, IP bearers, flows or their combinations using resources of cell 112A, and base station 110A.

At 334, the enhanced local area network connection may become unavailable, in which case user equipment 114B may close SAP 322A-B as depicted by 336-338. When SAP 322A-B is closed, the protocol services of the enhanced local area network may not be available, and the local area network connection may be terminated. At 340, the local area RRC entity for the enhanced local area connection may be deleted, and the user equipment context may be erased, deleted, and the like. This deletion may happen immediately, conditionally, or after a timer expiration to avoid unnecessary, frequent closing/opening actions. At 342, user equipment 114B may conduct data transfer via the EPS network 294 (e.g., via EPS bearers, IP bearers, flows using resources of cell 112A, and base station 110A), but not conduct transfers of data via the local area network 112B. The EPS RRC connection may be released at 343, in which case the state of the RRC may return to idle at 344.

Figure 4:
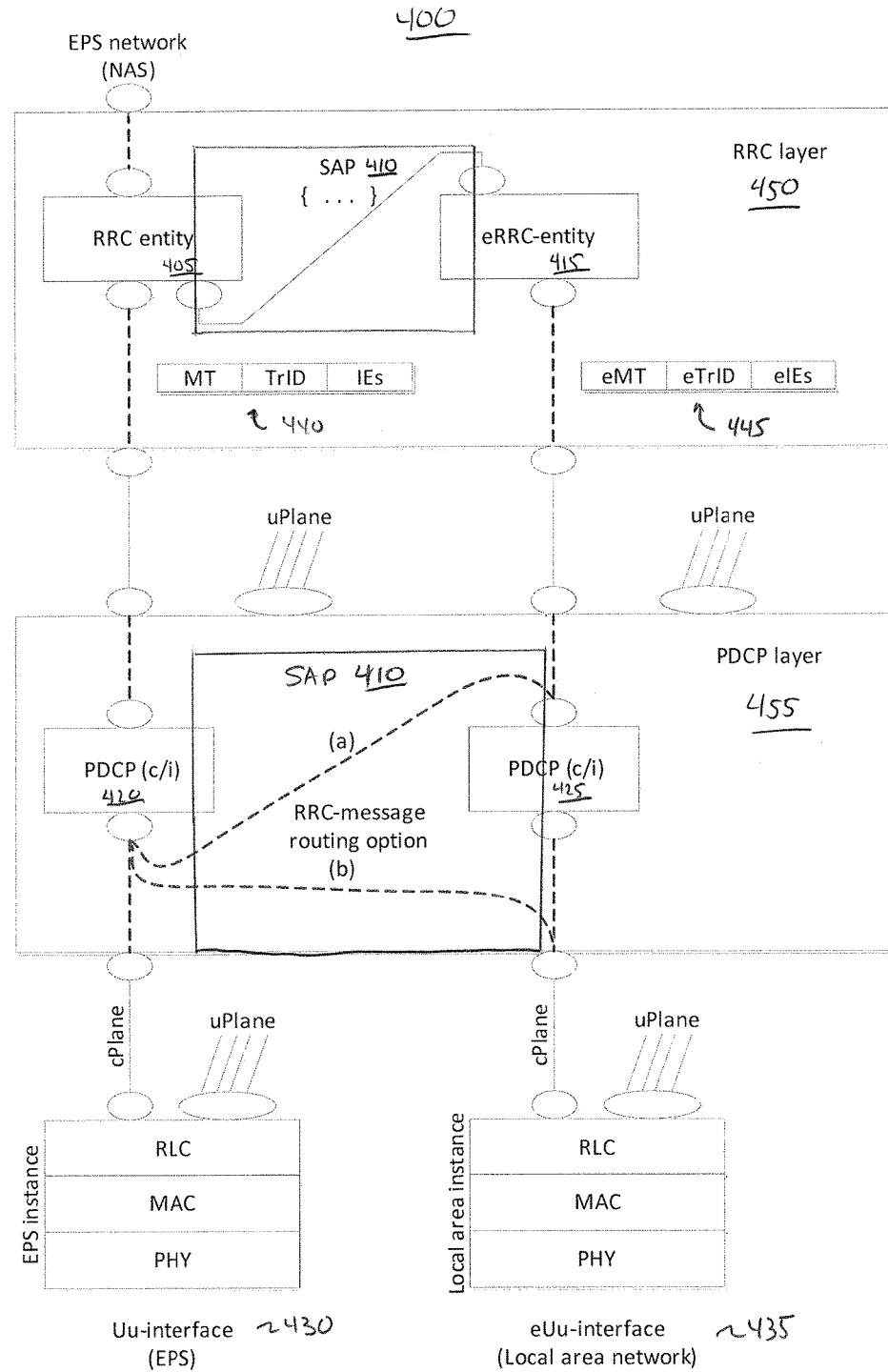
FIG. 4 depicts a service access point interfacing two RRC entities, in accordance with some example embodiments.

FIG. 4 depicts a single protocol stack 400 including a service access point 410 interfacing RRC entity 405 (which is operative with a first network, such as an EPS network) and another RRC entity 415 (which is labeled as eRRC entity operative with a second network, such as a local area radio network). The single protocol stack 400 may comprise one or more instructions (e.g., code) stored in a computer-readable storage medium and, when executed, provide the operations associated with the protocol(s) disclosed herein.

At a lower level, SAP 410 may serve as an interface between Packet Data Convergence Protocol 420 associated with the first network and the Packet Data Convergence Protocol 425 associated with the second network, and this interface may route RRC messages, in addition to its other functionalities. Multiplexing control plane signaling, such as RRC signaling, to an EPS network and to an enhanced local area radio network may be performed via the SAP 410 as SAP 410 defines the interface between RRC entities, such as the EPS RRC entity and the local area RRC entity. Various example embodiments for routing RRC messages between protocol entities disclosed herein.

FIG. 4 also shows a protocol stack comprising radio link control (RLC), media access control (MAC), and physical layer (PHY) instances for the EPS network (e.g., accessible via Uu-interface 430) and another separate RLC, MAC, and PHY instance for the local area radio network enhanced to provide RRC management/signaling via an eUu-interface 435. A single RLC/MAC/PHY protocol stack 400 may run for both the EPS network interface 430 and the enhanced local area network interface 435. However, even in the case of a single RLC/MAC/PHY protocol stack, the protocol layers may include a separate RLC entity per bearer.

In some example embodiments, the delivery of RRC messages may be treated differently based on message type. For example, when only the EPS network is available to the user equipment, the EPS RRC messages may be delivered to the network via an EPS stack (e.g., RRC entity 405, PDCP 420, Uu-interface 430, and the like) at the user equipment. When the enhanced local area radio network becomes also available, EPS RRC messages may still be delivered via the EPS network, but local area RRC messages from the EPS network may be delivered via the enhanced local area radio network (e.g., local area RRC entity 415, Packet Data Convergence, PDCP 425, eUu-interface 435, and the like). Moreover, the PDPC entities may be separate, and the PDPC entities may provide different ciphering and integrity protection (labeled "c/i") mechanisms. Moreover, when the enhanced local area network is used to deliver both the EPS RRC messages and enhanced local area messages, there may appear different routing options, either encapsulation or message separation. The routing options may be provided via the PDCP layer (e.g., by internal PDU creation options) as depicted in FIG. 4.

In some example embodiments, RRC messages may be differentiated based on type. For example, RRC messages for the EPS RRC entity may be formatted as depicted at FIG. 5A (see also FIG. 4 at 440), while RRC messages for the local area radio network may be formatted as depicted at FIG. 5B (see also FIG. 4 at 445). Although the message structure depicted at FIGS. 5A and 5B may be similar, the messages have separate instances and the RRC messages for the local area radio network may include additional information elements (IEs) specific to the local area network (which may be specified by a standard). As such, the message types of EPS RRC and the local area RRC may differ in value, value range, or by a separator field to indicate which one of the message types is present. Running different instances of messages may enable even very similar Information Elements to be composed and processed inside the message without error or confusion.

Figure 6:
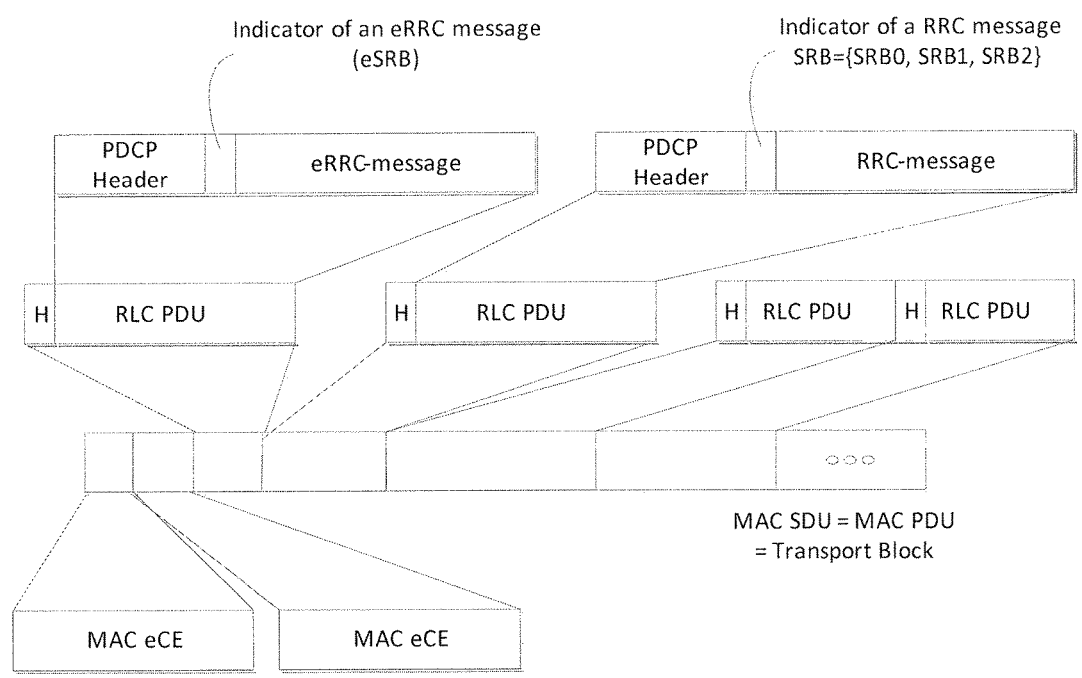
Figure 7A:
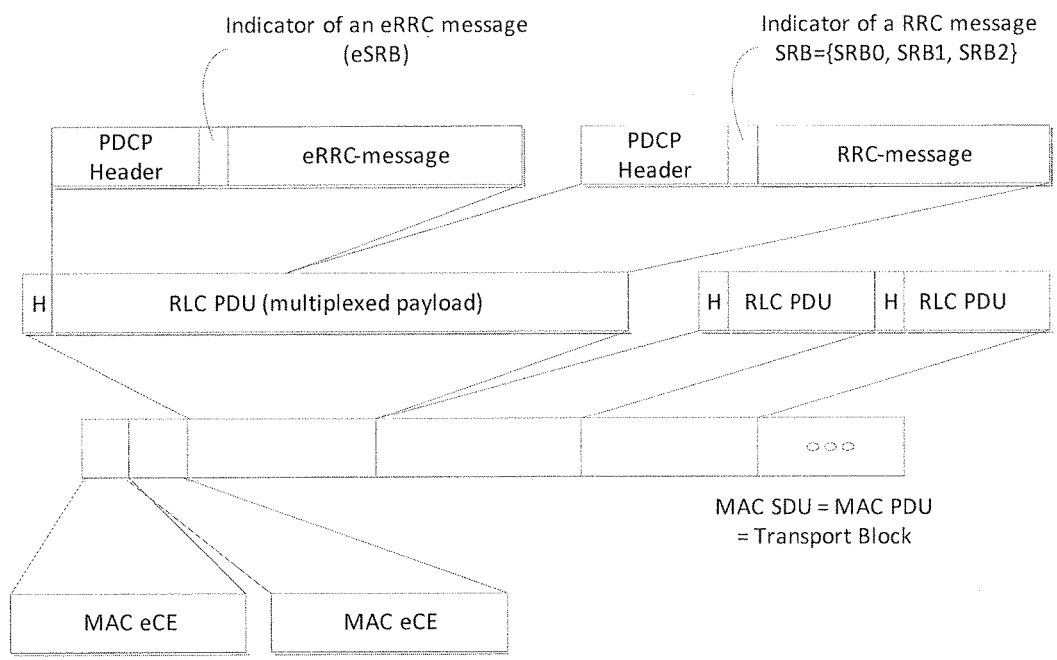

In some example embodiments, the RRC messages for the EPS network and the RRC messages for the local area radio network may use different air interfaces. However, in some example embodiments, the RRC messages for the EPS network and the RRC messages for the local area radio network may use the same air interface. For example, EPS RRC messages may be routed to be transmitted via the local area network, and hence they may appear as being transmitted or received over the eUu-interface, in addition to, or instead of, the Uu-interface. FIGS. 6 and 7A depict examples of ways to multiplex RRC messages when using the same interface.

Referring to FIG. 6, the RRC entities may have a different service access point to the PDCP protocol layer 455, and the PDCP (when receiving messages from either entity) may create a respective PDCP protocol data unit (PDU). These PDCP PDUs may then feed a separate RLC protocol entity. This approach may allow different logical channels for different PDCP PDUs, and different parameterizations at RLC and MAC as well. The PDPC PDUs may also face different priorities at the logical channels. If the same air interface is in use, the PDCP PDUs including RLC PDUs may be multiplexed to the same transport block.

Referring to FIG. 7A, RRC entities may use a common service access point to the PDCP protocol layer 455. The PDCP may, when receiving messages, obtain information regardless of whether the messages are for the EPS or for the local area network. The PDCP may then multiplex the messages into PDCP PDUs and then feed a single RLC protocol entity. This approach may use a single RLC entity and may not allow different parameterization at RLC and MAC. The PDCP may multiplex the upper layer messages to the same PDCP PDU and the PDCP may fill different, successive PDCP PDUs with the EPS message and local area message respectively. In some example embodiments, the PDCP may include an indicator in the header (e.g., in a reserved for future use field or other field as well) to indicate whether the contents are for EPS or for the local area radio network. Nevertheless, the PDCP may feed a single RLC and may fill a single transport block. In some implementations, the use of the indication may address legacy issues, such as when legacy networks omit the indication. Moreover, a local area radio network element may be configured to detect this indication (e.g., as a bit in the PDCP header) and determine whether the PDCP PDU is targeted to a processing entity of the first network (e.g., targeted to its own processing entity, such as the local area RRC entity) or whether it is targeted to a processing entity of the second network (e.g., EPS RRC). As such, the user equipment may determine, when composing and assembling the message into a PDCP PDU, whether to set this indication to the value of the selected routing option.

Figure 7B:
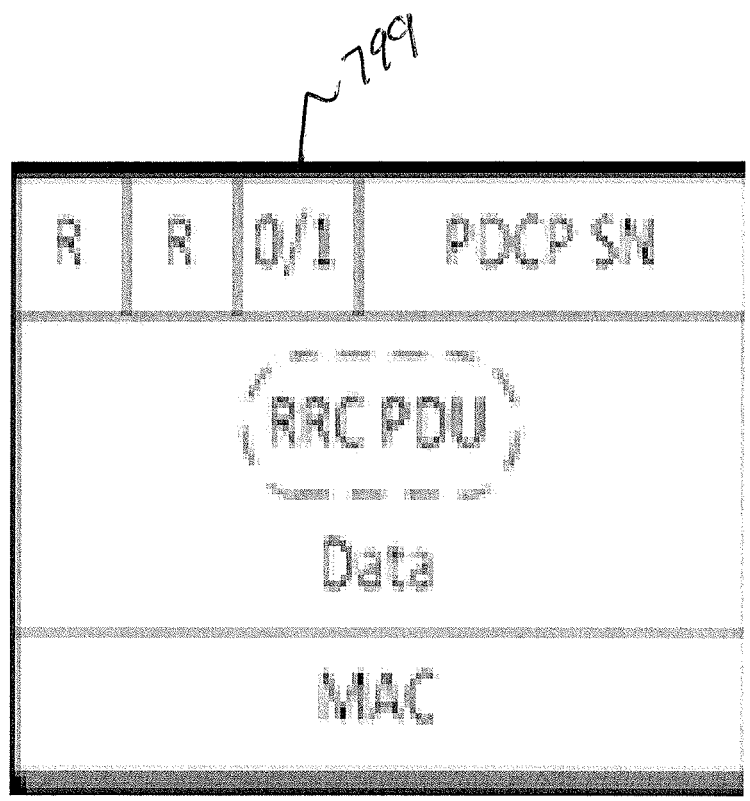
FIG. 7B depict an example of a PDCP header, in accordance with some example embodiments.

FIG. 7B depicts an example message, in accordance with some example implementations. In the example of FIG. 7B, the PDCP header field 799 may have a value of "0", which may be defined to indicate legacy compatibility that is to indicate an EPS RRC message, while a value of "1" may be defined to indicate that the RRC message is targeted to the local area network (example.g., to a local area RRC entity). In some implementations, the value "1" may not be understood by some legacy networks, although this may not cause confusion in those legacy networks. Any confusion may be minimized, if not avoided, by for example handling of the PDCP PDU in the local area network node. As such, any RLC PDU with the flag set to "1" may be processed inside the local area network, but it will not transfer to the EPS network. On the other hand, any PDCP PDU with the flag set to "0" may be transferred to the EPS network, where it is then legacy compatible as being the EPS PDCP PDU with its RFU flag set to "0" and carrying EPS RRC message.

Table 1 depicts an example RRC message definition.

TABLE 1

```
Message ::= SEQUENCE {
    Message DL_DCCH-MessageType
}

DL_DCCH-MessageType ::= CHOICE {
        C1
        Message_name {
            IE
            IE
        }
        HASH
    }
```

Table 2 depicts an example of protocol encapsulation (e.g., an eRRC.message carries a container including a RRC-message).

TABLE 2

```
Message ::= SEQUENCE {
    Message LTEHi-eMessageType
}

LTEHi-eMessageType ::= CHOICE {
        C1
        Message_name {
            eRRC_TransactionIdentfier
            eIE
            eIE
            eIE
            DL-DCCH-message {
        MessageType
        RRC_TransactionIdentifier
        IE
        IE
            }
            HASH
        }
        eHASH
    }
```

Table 3 depicts an alternative approach of a flat protocol implementation (e.g., eRRC-message and RRC-message are separated by MessageType and their processes may be separated by RRC_TransactionIdentifier).

TABLE 3

```
Message ::= SEQUENCE {
    Message LTEHi-eMessageType
}

LTEHi-eMessageType ::= CHOICE {
        C1
        Message_name {
            eRRC_TransactionIdentifier
            eIE
            eIE
            eIE
        }
        eHASH
}
Message ::= SEQUENCE {
    Message DL-DCCH-MessageType
}

DL-DCCH-MessageType ::= CHOICE {
        C1
        Message_name {
            RRC_TransactionIdentifier
            IE
            IE
        }
        HASH
    }
```

Figure 8:
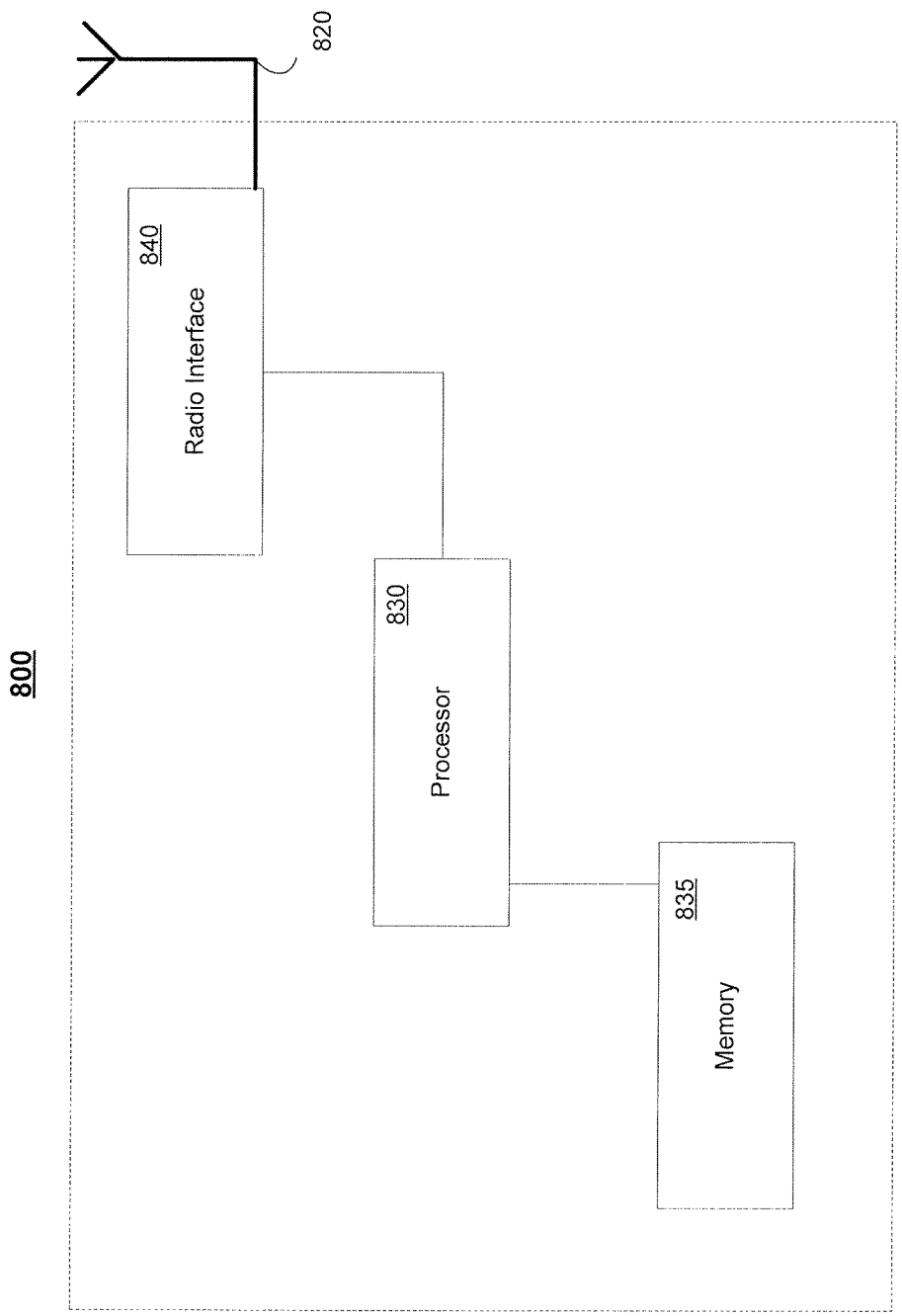
FIG. 8 depicts an example implementation of an access point, in accordance with some example embodiments.

FIG. 8 depicts an example implementation of an access point 800, which may be implemented at devices 110A or 110B. The access point may include one or more antennas 820 configured to transmit downlinks and configured to receive uplinks via the antenna(s) 820. The access point may further include a plurality of radio interfaces 840 coupled to the antenna 820. The radio interfaces may correspond to a plurality of radio access technologies including one or more of LTE, WLAN, Bluetooth, BT-LE, NFC, radio frequency identifier (RFID), ultrawideband (UWB), ZigBee, and the like. The access point may further include at least one processor, such as processor 830, for controlling the access point 800 and for accessing and executing program code stored in memory 835. In some example embodiments, the memory 835 includes code, which when executed by at least one processor causes one or more of the operations described herein with respect to an access point (e.g., establishing bearers, establishing RRC entities in the network to communicate with the user equipment's RRC entities, generate RRC signaling/messaging, and the like). The radio interface 840 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink).

Figure 9:
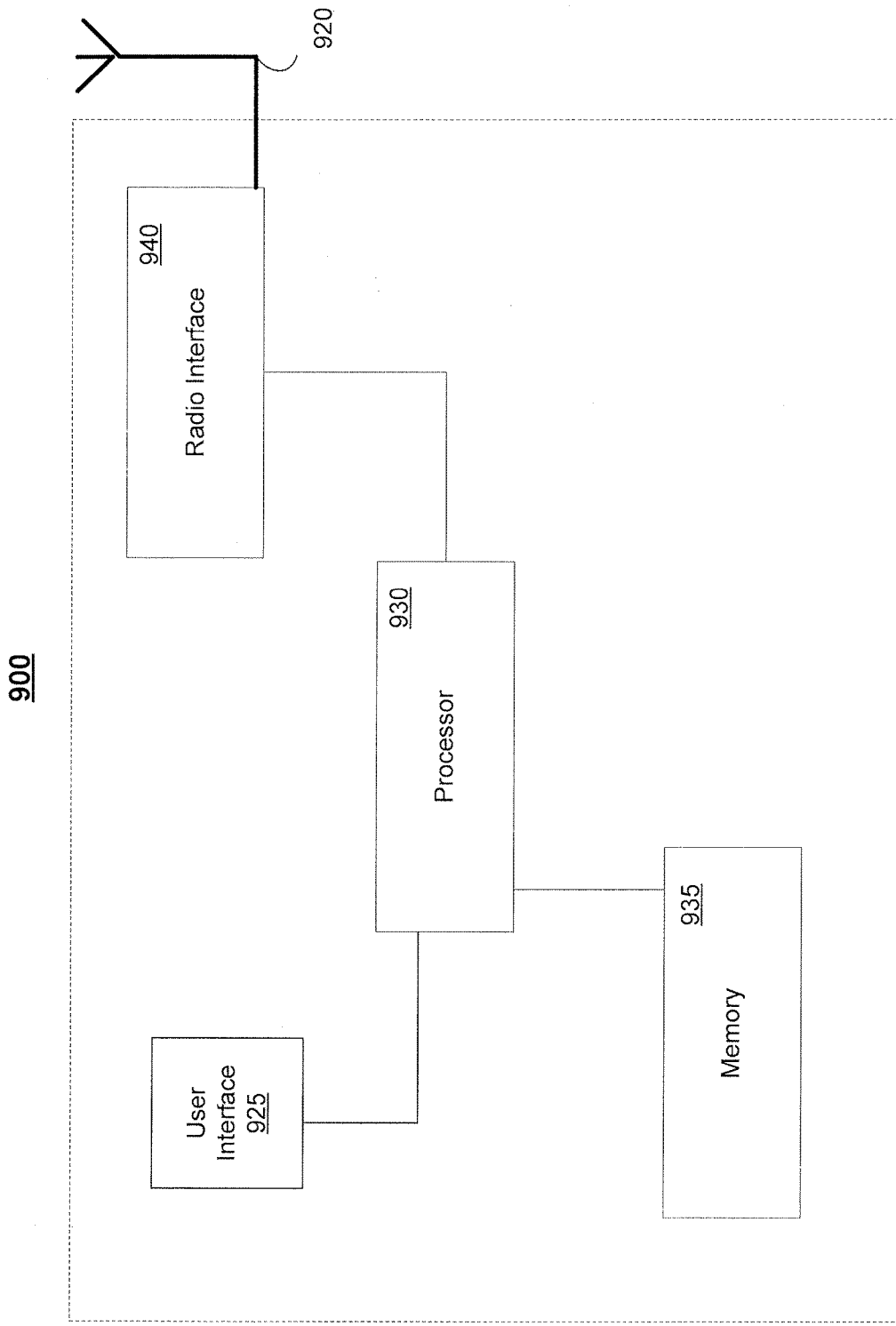
FIG. 9 depicts an example implementation of a radio, in accordance with some example embodiments.

FIG. 9 depicts a block diagram of a radio communication device, such as a user equipment 900. The user equipment 900 may include an antenna 920 for receiving downlinks and transmitting uplinks. The user equipment 900 may also include a radio interface 940 coupled to the antenna 920. The radio interface may correspond to a plurality of radio access technologies including one or more of LTE, WLAN, Bluetooth, BT-LE, NFC, RFID, UWB, ZigBee, and the like. The radio interface 940 may include other components, such as filters, converters (e.g., digital-to-analog converters and the like), symbol demappers, signal shaping components, an Inverse Fast Fourier Transform (IFFT) module, and the like, to process symbols, such as OFDMA symbols, carried by a downlink or an uplink. The user equipment 900 may further include a user interface 925, at least one processor, such as processor 930, for controlling user equipment 900 and for accessing and executing program code stored in memory 935. In some example embodiments, the memory 935 includes code, which when executed by at least one processor causes one or more of the operations described herein with respect to user equipment.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, firmware, or code or threads of code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations of the disclosed features and/or combinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   detecting, by a user equipment, a wireless local area radio network, the user equipment including a primary radio resource control entity configured to manage a radio resource of a cellular radio network;
   establishing, by the user equipment and in response to detecting the wireless local area radio network, a secondary radio resource control entity at the user equipment, the secondary radio resource control entity configured to manage a radio resource of the wireless local area radio network;
   determining, at the primary radio resource control entity, that one or more received messages are intended for the secondary radio resource control entity, the determining based on an indication to route the one or more received messages to the secondary radio resource control entity, the indication included in a header of the one or more received messages, the one or more received messages comprising a packet data convergence protocol message; and
   routing, via an interface and in response to the determining, the one or more received messages from the primary radio resource control entity to the secondary radio resource control entity.

2. The method of claim 1, further comprising:
   establishing, at the user equipment, a secondary packet data convergence protocol entity configured to manage the radio resource of the wireless local area radio network, wherein a primary packet data convergence protocol entity at the user equipment utilizes a second interface to communicate with the secondary packet data convergence protocol entity.

3. The method of claim 1, wherein the one or more received messages comprise one or more radio resource control messages, and wherein the routing from the primary radio resource control entity to the secondary radio resource control entity provides for management of the radio resource of the cellular network via the wireless local area radio network.

4. The method of claim 1, further comprising:
   receiving, via a first communications interface with the cellular radio network, first data at the primary radio resource control entity; and
   receiving, via a second communications interface with the wireless local area radio network, second data at the secondary radio resource control entity, wherein the first communications interface is different from the second communications interface.

5. The method of claim 1, wherein the interface, the primary radio resource control entity, and the secondary radio resource control entity are configured as part of a unitary protocol stack at the user equipment.

6. The method of claim 1, further comprising:
   deleting, by the user equipment and in response to determining that services for the wireless local area radio network are unavailable, the secondary radio resource control entity.

7. The method of claim 1, wherein the wireless local area radio network comprises a wireless local area radio network which, at a time of the detecting, is not connected with the user equipment.

8. An apparatus comprising:
   at least one processor; and
   at least one memory including computer program code, the at least one memory and the computer program code configured to, with the at least one processor, cause the apparatus to at least:
   detect a wireless local area radio network, the apparatus including a primary radio resource control entity configured to manage a radio resource of a cellular radio network;
   establish, in response to the wireless local area radio network detection, a secondary radio resource control entity at the apparatus, the secondary radio resource control entity configured to manage a first radio resource of the wireless local area radio network;
   determine, at the primary radio resource control entity, that one or more received messages are intended for the secondary radio resource control entity, the determination based on an indication to route the one or more received messages to the secondary radio resource control entity, the indication included in a header of the one or more received messages, the one or more received messages comprising a packet data convergence protocol message; and route, via an interface and in response to the determination, the one or more received messages from the primary radio resource control entity to the secondary radio resource control entity.

9. The apparatus of claim 8, wherein the apparatus is further caused to at least:

establish a secondary packet data convergence protocol entity configured to manage the radio resource of the wireless local area radio network, wherein a primary packet data convergence protocol entity at the apparatus utilizes a second interface to communicate with the secondary packet data convergence protocol entity.

10. The apparatus of claim 8, wherein the one or more received messages comprise one or more radio resource control messages, and wherein the routing from the primary radio resource control entity to the secondary radio resource control entity provides for management of the radio resource of the cellular network via the wireless local area radio network.

11. The apparatus of claim 8, wherein the apparatus is further caused to at least:

receive, via a first communications interface with the cellular radio network, first data at the primary radio resource control entity; and receive, via a second communications interface with the wireless local area radio network, second data at the secondary radio resource control entity, wherein the first communications interface is different from the second communications interface.

12. The apparatus of claim 8, wherein the interface, the primary radio resource control entity, and the secondary radio resource control entity are configured as part of a unitary protocol stack at a user equipment.

13. A non-transitory computer-readable medium comprising computer program code which when executed by at least one processor causes operations comprising:

detecting, by a user equipment, a wireless local area radio network, the user equipment including a primary radio resource control entity configured to manage a radio resource of a cellular radio network;

establishing, by the user equipment and in response to detecting the wireless local area radio network, a secondary radio resource control entity at the user equipment, the secondary radio resource control entity configured to manage a radio resource of the wireless local area radio network;

determining, at the primary radio resource control entity, that one or more received messages are intended for the secondary radio resource control entity, the determining based on an indication to route the one or more received messages to the secondary radio resource control entity, the indication included in a header of the one or more received messages, the one or more received messages comprising a packet data convergence protocol message; and routing, via an interface and in response to the determining, the one or more received messages from the primary radio resource control entity to the secondary radio resource control entity.

14. The computer-readable medium of claim 13, wherein the operations further comprise:

establishing, at the user equipment, a secondary packet data convergence protocol entity configured to manage the radio resource of the wireless local area radio network, wherein a primary packet data convergence protocol entity at the user equipment utilizes a second interface to communicate with the secondary packet data convergence protocol entity.

15. The computer-readable medium of claim 13, wherein the one or more received messages comprise one or more radio resource control messages, and wherein the routing from the primary radio resource control entity to the secondary radio resource control entity provides for management of the radio resource of the cellular network via the wireless local area radio network.

16. The computer-readable medium of claim 13, wherein the operations further comprise:

receiving, via a first communications interface with the cellular radio network, first data at the primary radio resource control entity; and receiving, via a second communications interface with the wireless local area radio network, second data at the secondary radio resource control entity, wherein the first communications interface is different from the second communications interface.

17. The computer-readable medium of claim 13, wherein the interface, the primary radio resource control entity, and the secondary radio resource control entity are configured as part of a unitary protocol stack at the user equipment.

* * * * *